United States Patent
Yoshida

(10) Patent No.: US 8,913,296 B2
(45) Date of Patent: Dec. 16, 2014

(54) DITHER MATRIX CREATING DEVICE

(75) Inventor: Yasunari Yoshida, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 164 days.

(21) Appl. No.: 13/429,573

(22) Filed: Mar. 26, 2012

(65) Prior Publication Data

US 2013/0027753 A1    Jan. 31, 2013

(30) Foreign Application Priority Data

Jul. 27, 2011    (JP) ................................. 2011-164715

(51) Int. Cl.
*H04N 1/40*    (2006.01)
*H04N 1/405*    (2006.01)
*H04N 15/00*    (2006.01)

(52) U.S. Cl.
CPC ........... *H04N 1/4053* (2013.01); *H04N 1/4055* (2013.01); *H04N 1/405* (2013.01); *H04N 1/4051* (2013.01)
USPC ......... 358/3.16; 358/1.9; 358/3.03; 358/3.06; 358/3.13; 358/3.18; 358/3.19

(58) Field of Classification Search
USPC ................................. 358/3.06–3.23, 533–536
See application file for complete search history.

(56) References Cited

U.S. PATENT DOCUMENTS

| | | | | |
|---|---|---|---|---|
| 5,111,310 A | * | 5/1992 | Parker et al. | 358/3.19 |
| 5,696,602 A | * | 12/1997 | Cooper et al. | 358/3.19 |
| 5,917,951 A | * | 6/1999 | Thompson et al. | 382/237 |
| 5,953,459 A | * | 9/1999 | Ueda et al. | 382/237 |
| 6,020,978 A | * | 2/2000 | Cooper et al. | 358/1.9 |
| 6,474,766 B1 | * | 11/2002 | Cooper | 347/15 |
| 6,862,112 B2 | * | 3/2005 | Cooper | 358/1.9 |
| 7,463,387 B2 | * | 12/2008 | Hagai et al. | 358/3.03 |
| 8,004,719 B2 | * | 8/2011 | Asai | 358/3.13 |
| 8,139,267 B2 | * | 3/2012 | Mizutani | 358/3.21 |
| 8,363,279 B2 | * | 1/2013 | Kikuchi et al. | 358/3.06 |
| 2003/0169455 A1 | * | 9/2003 | Takahashi et al. | 358/3.03 |
| 2004/0119765 A1 | | 6/2004 | Fujimori et al. | |
| 2005/0063015 A1 | * | 3/2005 | Kakutani | 358/3.12 |
| 2005/0122534 A1 | * | 6/2005 | Kakutani | 358/1.9 |

FOREIGN PATENT DOCUMENTS

| | | |
|---|---|---|
| JP | 2000-099716 A | 4/2000 |
| JP | 2003-182120 A | 7/2003 |
| JP | 2008-153914 A | 7/2008 |

* cited by examiner

*Primary Examiner* — Richard Zhu
(74) *Attorney, Agent, or Firm* — Scully, Scott, Murphy & Presser, PC

(57) ABSTRACT

A dither matrix creating device acquires a basic dither matrix and modifies the basic dither matrix to provide a modified dither matrix including a plurality of sets of threshold value. Each threshold value set includes N threshold values (N≥2. An image processing device can perform both dither method and error diffusion method for converting an input image into an output image. Each pixel of the output image has an (N+1)-level output value. The modifying unit modifies the basic dither matrix by adjusting at least one of N threshold values such that the image processing device can produce a first output image by using the modified dither matrix according to the dither method. The first output image is more similar to an output image produced based on the input image according to the error diffusion method than an output image to be produced by using the basic dither matrix.

11 Claims, 8 Drawing Sheets

FIG.2A

|  | S | M | L |
|---|---|---|---|
| THRESHOLD VALUE (ET) | 0 | 238 | 506 |
| RELATIVE DENSITY VALUE (V) | 238 | 506 | 1023 |

FIG.2B

|  | S | M | L |
|---|---|---|---|
| THRESHOLD VALUE (T) | 0 | 134 | 284 |
| RELATIVE DENSITY VALUE (V) | 238 | 506 | 1023 |

FIG.2C

|  | S | M | L |
|---|---|---|---|
| THRESHOLD VALUE (T) | 0 | 133 | 284 |
| RELATIVE DENSITY VALUE (V) | 238 | 506 | 1023 |

FIG.3

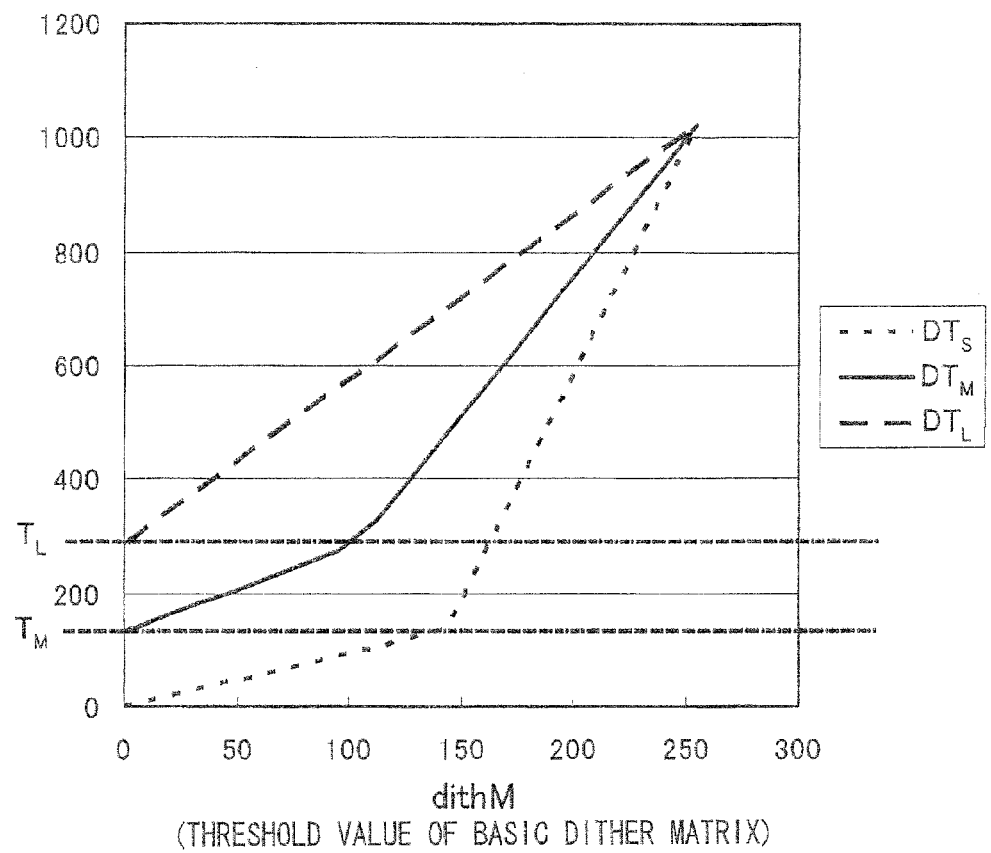

FIG.4B

| dithM | $DT_S$ | $DT_M$ | $DT_L$ |
|---|---|---|---|
| 0 | 1 | 134 | 284 |
| 1 | 2 | 135 | 287 |
| 2 | 3 | 137 | 290 |
| 3 | 4 | 138 | 293 |
| 4 | 5 | 140 | 296 |
| 16 | 16 | 157 | 330 |
| 32 | 31 | 181 | 377 |
| 48 | 46 | 204 | 423 |
| 64 | 61 | 227 | 469 |
| 80 | 76 | 251 | 516 |
| 96 | 91 | 274 | 562 |
| 112 | 106 | 329 | 609 |
| 128 | 120 | 406 | 655 |
| 144 | 138 | 484 | 701 |
| 160 | 266 | 562 | 748 |
| 176 | 393 | 639 | 794 |
| 192 | 521 | 717 | 840 |
| 208 | 648 | 795 | 887 |
| 224 | 776 | 872 | 933 |
| 240 | 903 | 950 | 980 |
| 254 | 1015 | 1018 | 1020 |
| 255 | 1023 | 1023 | 1023 |

DITHER MATRIX CREATING DEVICE

CROSS REFERENCE TO RELATED APPLICATION

This application claims priority from Japanese Patent Application No. 2011-164715 filed Jul. 27, 2011. The entire content of the priority application is incorporated herein by reference.

TECHNICAL FIELD

The present invention relates to a dither matrix creating device.

BACKGROUND

Error diffusion methods, dither methods, and other techniques of halftone processing are well known in the art. Different methods of halftone processing produce different patterns in the output image, even when the same input image is subjected to the halftone processes. Therefore, a technology has been proposed for an image processor capable of executing a thresholding process based on an error diffusion method and a dither method that can ensure that colors rendered in the error diffusion method substantially match the colors rendered in the dither method. In order to make the output image produced by the dither method closely resemble the output image produced through the error diffusion method, this conventional technology sets threshold values for the dither matrix used in the dither method to conform with color tones of the image produced in the error diffusion method.

SUMMARY

However, the conventional technology described above is based on a thresholding process (a process that produces binary output values) and does not consider halftone processes for converting input values into multi-level output values of three or more levels.

In view of the foregoing, it is an object of the present invention to provide a technique of halftone processing for converting input values into multi-level output values of three or more levels that is capable of producing a similar quality in the output image whether the halftone process is executed using an error diffusion method or a dither method.

In order to attain the above and other objects, the invention provides a dither matrix creating device including a processor. The processor is configured to function as an acquiring unit and a modifying unit. The acquiring unit is configured to acquire a basic dither matrix including a plurality of threshold value. The modifying unit is configured to modify the basic dither matrix to provide a modified dither matrix. The modified dither matrix includes a plurality of sets of threshold value. Each threshold value set includes N number of threshold values. N is an integer greater than 1. The modified dither matrix is used by an image processing device for converting an input image into an output image according to a dither method. The image processing device is capable of converting an input image into an output image according to an error diffusion method. The input image includes a plurality of input pixels each having a multi-level input density value. The output image includes a plurality of output pixels each corresponding to respective one of the plurality of input pixels. Each output pixel has an (N+1)-level output value. Each output value indicates one of (a) that no dot is formed and (b) that one of N types of dots is formed. A dot $D_J$ indicates J-th dot of the N types of dots. A density represented by a dot $D_J$ is greater as J gets greater. J is an integer greater than or equal to 1 and smaller than or equal to N. The N threshold values include threshold values $DT_J$ indicating J-th threshold value. When the image processing device converts an input image into an output image according to the dither method, the image processing device converts each input density value into an output value in such a manner that: the image processing device converts an input density value of an input pixel into an output value indicating that the dot $D_N$ is formed if the input density value is greater than or equal to the threshold value $DT_N$; the image processing device converts an input value into an output value indicating that a dot $D_{J-1}$ is formed if the input density value is smaller than the threshold value $DT_J$ and greater than or equal to the threshold value $DT_{J-1}$ where J is greater than 1 and smaller than or equal to N; and the image processing device converts an input value into an output value indicating that no dot is formed if the input density value is smaller than the threshold value $DT_1$. The modifying unit modifies the basic dither matrix by adjusting at least one of N threshold values such that the image processing device can produce a first output image by using the modified dither matrix according to the dither method. The first output image is more similar to an output image produced based on the input image according to the error diffusion method than an output image to be produced by using the basic dither matrix according to the dither method.

According to another aspect, the present invention provides a non-transitory computer readable storage medium storing a set of program instructions installed on and executed by a computer, the program instructions comprising: acquiring a basic dither matrix including a plurality of threshold value; and modifying the basic dither matrix to provide a modified dither matrix, the modified dither matrix including a plurality of sets of threshold value, each threshold value set including N number of threshold values, N being an integer greater than 1, the modified dither matrix being used by an image processing device for converting an input image into an output image according to a dither method, the image processing device being capable of converting an input image into an output image according to an error diffusion method, the input image including a plurality of input pixels each having a multi-level input density value, the output image including a plurality of output pixels each corresponding to respective one of the plurality of input pixels, each output pixel having an (N+1)-level output value, each output value indicating one of (a) that no dot is formed and (b) that one of N types of dots is formed, a dot $D_J$ indicating J-th dot of the N types of dots, a density represented by a dot $D_J$ being greater as J gets greater, J being an integer greater than or equal to 1 and smaller than or equal to N, the N threshold values including threshold values $DT_J$ indicating J-th threshold value. When the image processing device converts an input image into an output image according to the dither method, the image processing device converts each input density value into an output value in such a manner that: the image processing device converts an input density value of an input pixel into an output value indicating that the dot $D_N$ is formed if the input density value is greater than or equal to the threshold value $DT_N$; the image processing device converts an input value into an output value indicating that a dot $D_{J-1}$ is formed if the input density value is smaller than the threshold value $DT_J$ and greater than or equal to the threshold value $DT_{J-1}$ where J is greater than 1 and smaller than or equal to N; and the image processing device converts an input value into an output value indicating that no dot is formed if the input density value is smaller than the threshold value $DT_1$. The basic dither matrix is modified to the modified dither matrix by adjusting at least one of N number of threshold values such that the image processing device can produce a first output image by using the modified dither matrix according to the dither method, the first output image being more similar to an output image produced based on the input image according to the error diffusion method than an output image to be produced by using the basic dither matrix according to the dither method.

According to another aspect, the present invention provides a dither matrix creating method comprising: acquiring a basic dither matrix including a plurality of threshold value; and modifying the basic dither matrix to provide a modified dither matrix, the modified dither matrix including a plurality of sets of threshold value, each threshold value set including N number of threshold values, N being an integer greater than 1, the modified dither matrix being used by an image processing device for converting an input image into an output image according to a dither method, the image processing device being capable of converting an input image into an output image according to an error diffusion method, the input image including a plurality of input pixels each having a multi-level input density value, the output image including a plurality of output pixels each corresponding to respective one of the plurality of input pixels, each output pixel having an (N+1)-level output value, each output value indicating one of (a) that no dot is formed and (b) that one of N types of dots is formed, a dot $D_J$ indicating J-th dot of the N types of dots, a density represented by a dot $D_J$ being greater as J gets greater, J being an integer greater than or equal to 1 and smaller than or equal to N, the N threshold values including threshold values $DT_J$ indicating J-th threshold value. When the image processing device converts an input image into an output image according to the dither method, the image processing device converts each input density value into an output value in such a manner that: the image processing device converts an input density value of an input pixel into an output value indicating that the dot $D_N$ is formed if the input density value is greater than or equal to the threshold value $DT_N$; the image processing device converts an input value into an output value indicating that a dot $D_{J-1}$ is formed if the input density value is smaller than the threshold value $DT_J$ and greater than or equal to the threshold value $DT_{J-1}$ where J is greater than 1 and smaller than or equal to N; and the image processing device converts an input value into an output value indicating that no dot is formed if the input density value is smaller than the threshold value $DT_1$. The basic dither matrix is modified to the modified dither matrix by adjusting at least one of N number of threshold values such that the image processing device can produce a first output image by using the modified dither matrix according to the dither method, the first output image being more similar to an output image produced based on the input image according to the error diffusion method than an output image to be produced by using the basic dither matrix according to the dither method.

BRIEF DESCRIPTION OF THE DRAWINGS

The particular features and advantages of the invention as well as other objects will become apparent from the following description taken in connection with the accompanying drawings, in which:

FIG. 2A shows an example of table used in an error diffusion method performed by a data processing device of the dither matrix creating device according to the first embodiment;

FIG. 2B shows an example of table used in a dither method performed by the data processing device according to the first embodiment;

FIG. 2C shows an example of table used in a dither method performed by the data processing device according to the second embodiment;

FIG. 3 is an explanatory diagram showing an example of basic dither matrix;

FIG. 4A is a graph showing relationships between threshold values of the basic dither matrix and adjusted threshold values;

FIG. 4B is a part of a table showing the relationships of FIG. 4A;

DETAILED DESCRIPTION

Next, preferred embodiments of the present invention will be described while referring to the accompanying drawings.

1. First Embodiment 1-1. Overall Structure of a Printing System

Figure 1:
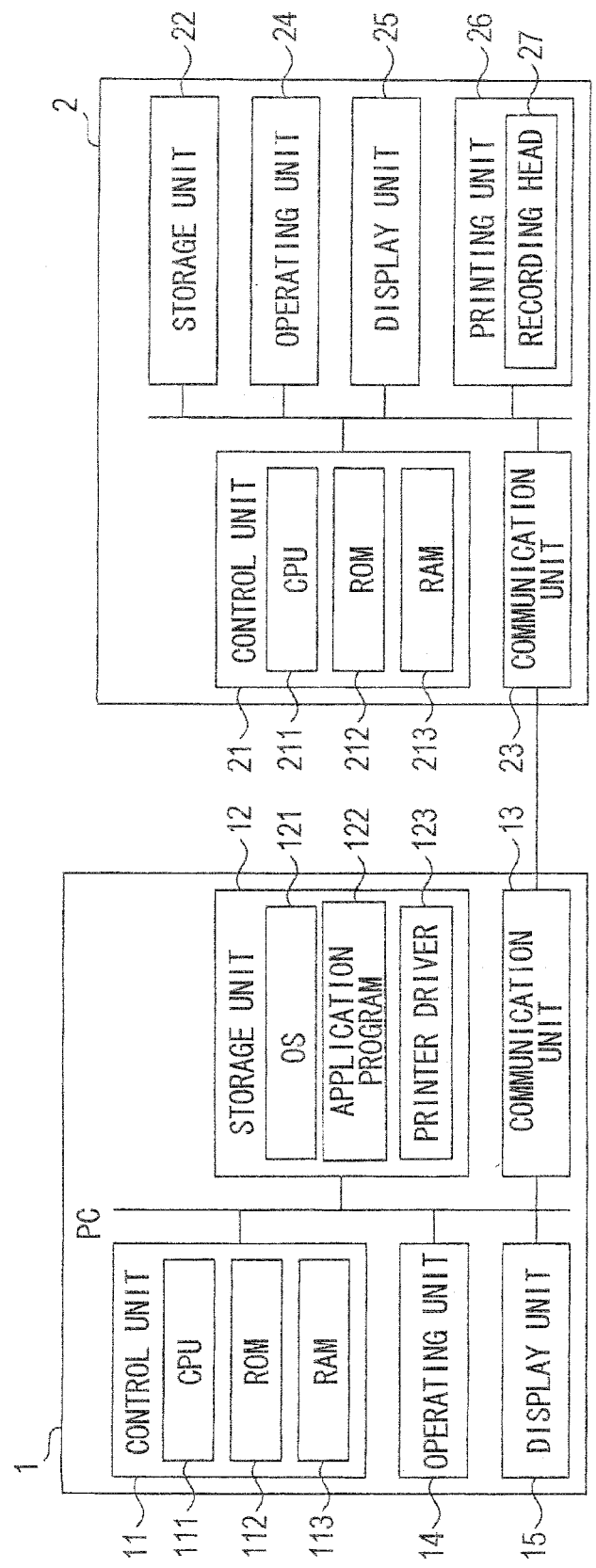
FIG. 1 is a block diagram showing an image forming device and a dither matrix creating device according to a first embodiment of the present invention.

FIG. 1 is a block diagram showing the general structure of a printing system including a personal computer (PC) 1 and a printer 2 that are capable of performing data communications with each other.

The PC 1 is a common data processor that includes a controller 1 unit, a storage unit 12, a communication unit 13, an operating unit 14, and a display unit 15. The control unit 11 performs overall control of each component in the PC 1. The control unit 11 includes a CPU 111, a ROM 112, and a RAM 113. The storage unit 12 is a nonvolatile storage device for storing data that can be overwritten. In the first embodiment, a hard disk drive is employed as the storage unit 12. Various software programs are installed on the storage unit 12, including an operating system (OS) 121; application programs 122 for implementing graphical program and other applications (so-called software); and a printer driver 123 for enabling a user to use the printer 2 through the PC 1. The communication unit 13 is an interface for performing data communications with the printer 2. The operating unit 14 is an input device that allows the user to input instructions through external operations. In the first embodiment, the operating unit 14 is configured of a keyboard and a pointing device (a mouse, touchpad, or the like). The display unit 15 is an output device for displaying various data in a visual form that the user can understand. In the first embodiment, the display unit 15 is configured of a liquid crystal display.

The printer 2 is an inkjet-type recording device including a control unit 21, a storage unit 22, a communication unit 23, an operating unit 24, a display unit 25, and a printing unit 26. The control unit 21 performs overall control of each component in the printer 2. The control unit 21 includes a CPU 211, a ROM 212, and a RAM 213. The storage unit 22 is a nonvolatile storage device for storing data that can be overwritten. In the first embodiment, a flash memory drive is employed as the storage unit 22. The communication unit 23 is an interface for performing data communications with the PC 1. The operating unit 24 is an input device allowing the user to input instructions through external operations and includes various operation buttons. The display unit 25 is an output device for displaying various data in a visual form that the user can understand. In the first embodiment, the display unit 25 is configured of a liquid crystal display.

The printing unit 26 includes a recording head 27. The recording head 27 is capable of reciprocating in a direction perpendicular to a conveying direction in which a recording sheet (recording medium). A plurality of nozzles for discharging ink drops for each color of cyan (C), magenta (M), yellow (Y), and black (K) is provided on a lower surface of the recording head 27 (a surface facing the recording sheet). While the recording head 27 discharges the ink drops in the reciprocating operation, dots is formed on the recording sheet. The recording head 27 is capable of forming three-type dots each having a different size by adjusting a discharge amount of ink drops. In other words, the recording head 27 can form four type of dot formation (four levels tone) including a large dot, medium dot, small dot, and no dot. The printing unit 26 controls the recording head 27 to drive according to print data. The print data indicates dot formations of C, M, Y, and K colors for each pixels configured of an image. The printing unit 26 controls the recording head 27 to discharge ink drops corresponding to C, M, Y, K values indicated by the print data.

1-2. Processes Performed on the Printing System

Next, a process executed by the printing system of the preferred embodiment will be described. The printer driver 123 starts up on the PC 1 when the user of the PC 1 executes a print operation in the application program 122 while the application program 122 is executing. When the printer driver 123 is launched, the control unit 11 of the PC 1 performs a color conversion process to convert image data representing the image to be printed and expressed in 256-level RGB values to image data expressed in 256-level CMYK values. The control unit 11 also executes a halftone process to convert the image data produced from the color conversion process into image data expressed in 4-level CMYK values (print data) and supplies the print data to the printer 2. As a result, the printer 2 controls the printing unit 26 to print an image based on the print data supplied from the PC 1. For practicality of arithmetic processing, the PC 1 performs a halftone process on an input image expressed in 1024 levels (values between 0 and 1023), which is conveniently four times 256 levels (values between 0 and 255), and then converts the result to a 4-level output image.

The PC 1 of the first embodiment is capable of executing halftone processes according to both an error diffusion method and a dither method. The error diffusion method and dither method implemented by the PC 1 according to the first embodiment will be described here.

The error diffusion method performed by the PC 1 according to the first embodiment is a multi-level error diffusion method for converting a 1024-level input density value of a target pixel to a 4-level output value for each pixel constituting an input image and for reflecting error values acquired by subtracting a relative density value corresponding to the output value (type of dot formation) from the input density value (corrected density value) in unprocessed pixels.

More specifically, the PC 1 sequentially selects one of the pixels in the input image as a target pixel (a pixel to be processed). The PC 1 acquires the value of this target pixel (input density value) and calculates a corrected density value by adding a recorded error value that has been recorded in an error buffer for this target pixel to the input density value. The error buffer serves to store recorded density values for each pixel. An error value produced by processing the target pixel (the value obtained by subtracting the relative density value from the corrected density value) is distributed at a prescribed ratio to a plurality of unprocessed pixels positioned around this target pixel and is recorded as the recorded error value for each pixel. If a recorded error value is already recorded, the new value is added to the already recorded error value. That is, when processing a certain pixel as the target pixel, error values generated in a plurality of neighboring pixels to the target pixel that were processed prior to processing the target pixel have been accumulated at a prescribed ratio and recorded as the recorded error value for the current target pixel.

Next, the corrected density value calculated as described above is quantized based on comparisons to predetermined threshold values. When the output value is a 4-level value (large dot, medium dot, small dot, or no dot), as in the first embodiment, a single set of three threshold values $ET_S$, $ET_M$, and $ET_L$ having the relationship $ET_S \leq ET_M \leq ET_L$ is used. More specifically, the PC 1 converts the corrected density value into an output value corresponding to the formation of a large dot when the corrected density value is greater than or equal to the threshold value $ET_L$, converts the corrected density value into an output value corresponding to the formation of a medium dot when the corrected density value is less than the threshold value $ET_L$ but greater than or equal to the threshold value $ET_M$, converts the corrected density value into an output value corresponding to the formation of a small dot when the corrected density value is less than the threshold value $ET_M$ but greater than or equal to the threshold value $ET_S$, and converts the corrected density value into an output value corresponding to no dot formation when the corrected density value is less than the threshold value $ET_S$. In other words, the PC1 converts the corrected density value into an output value indicating that no dot is formed and or that one of three types of dots is formed. An error value of the target pixel is calculated by subtracting a relative density value corresponding to the output value from the corrected density value. In the first embodiment, the threshold value $ET_S$ is set to "0", the threshold value $ET_M$ to "238", and the threshold value $ET_L$ to "506", as shown in FIG. 2A. Further, a relative density value $V_S$ corresponding to the formation of a small dot is set to "238", a relative density value $V_M$ corresponding to the formation of a medium dot is set to "506", and a relative density value $V_L$ corresponding to the formation of a large dot is set to "1023". The PC 1 converts an input image including input pixels each having the relative density value corresponding to the dot formation into an output image including at least one pixel having an output value indicating that the corresponding dot is formed.

The error value calculated above is distributed at a prescribed ratio to unprocessed neighboring pixels around the target pixel, as described above, with the distributed error being recorded (added to an already recorded value) for each neighboring pixel in the error buffer as a recorded error value.

By performing the process described above for all pixels constituting the process image, 4-level output image data is generated.

Methods of error diffusion known in the art include error-dispersion methods (diffusion methods) for dispersing (diffusing) error to neighboring pixels and error-collection methods (accumulating methods) for collecting error from neighboring pixels. This description will apply an error-dispersion method, but an error-collection method may also be used.

The dither method executed by the PC 1 in the first embodiment, on the other hand, is an image-processing method that converts a 1,024-level input density value of the target pixel to a 4-level output value based on the three threshold values $DT_S$, $DT_M$, and $DT_L$ (where $DT_S \leq DT_M \leq DT_L$) associated with the target pixel from among the threshold values provided in the dither matrix for each pixel in the input image (multi-level dither method). In other words, the dither matrix includes three threshold values $DT_S$, $DT_M$, and $DT_L$ in each position corresponding to a pixel unit of the input image. When the input density value is greater than or equal to the threshold value $DT_L$, the PC 1 converts the input density value into an output value corresponding to the formation of a large dot. Similarly, if the input density value is less than the threshold value $DT_L$ but greater than or equal to the threshold value $DT_M$, the PC 1 converts the input density value into an output value corresponding to the formation of a medium dot. If the input density value is less than the threshold value $DT_M$ but greater than or equal to the threshold value $DT_S$, the PC 1 converts the input density value into an output value corresponding to the formation of a small dot. When the input density value is less than the threshold value $DT_S$, the PC 1 converts the input density value into an output value corresponding to no dot formation.

The PC 1 can selectively execute halftone processes using either the error diffusion method or dither method described above based on user settings, for example. However, the quality of the outputted image commonly differs when the halftone process is executed using an error diffusion method and when the process is executed using a dither method.

Therefore, the PC 1 of the first embodiment performs an adjustment process to adjust the three threshold values $DT_S$, $DT_M$, and $DT_L$ in the dither matrix in order that the output image produced when executing the dither method on an input image resembles an output image produced when using the error diffusion method on the same input image.

1-3. Adjustment Process

Figure 3:
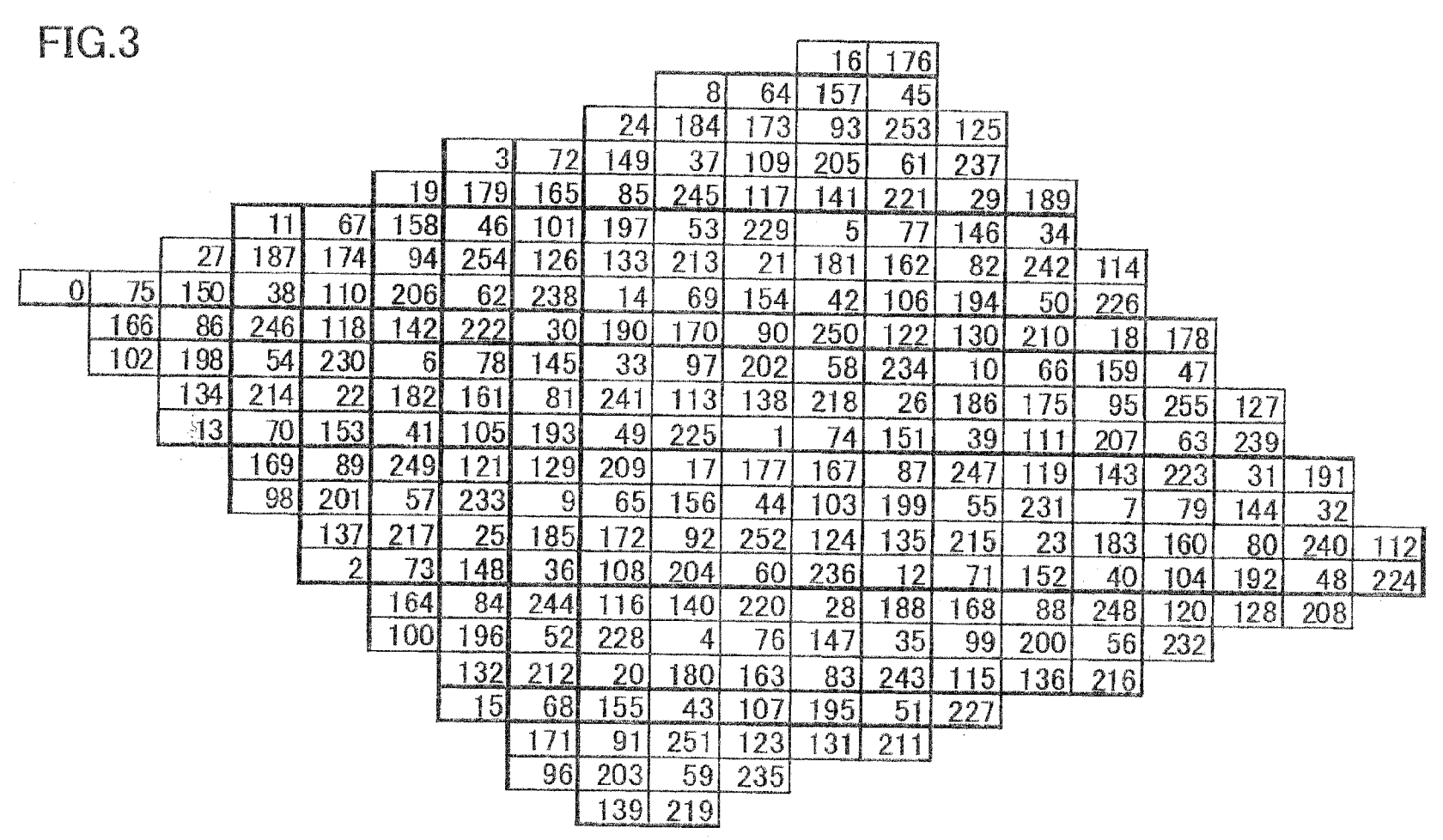

Next, an adjustment process executed by the control unit 11 of the PC 1 will be described. The control unit 11 adjusts the three threshold values $DT_S$, $DT_M$, and $DT_L$ used in the dither method by increasing and decreasing threshold values in a prepared basic dither matrix. FIG. 3 shows a sample basic dither matrix, which has threshold values comprising one each of the values 0-255. Patterns for allocating threshold values in the dither matrix known in the art include dispersed-dot patterns (Bayer and blue noise patterns, for example) with which dots grow in dispersed positions as the input density value increases, and clustered-dot patterns with which dots grow in clusters. The pattern of threshold values in the basic dither matrix preferably conforms to the pattern of dot generation in the error diffusion method. Since the error diffusion method used in the first embodiment is a dispersed-dot growth pattern, the threshold values in the basic dither matrix are allocated in a dispersed dot pattern. Note that when the error diffusion method is a clustered-dot growth pattern, which prevents the generation of isolated dots, for example, then the threshold values of the basic dither matrix are preferably arranged in a clustered-dot pattern, such as a dot dither.

The control unit 11 sets the three threshold values $DT_S$, $DT_M$, and $DT_L$ by increasing or decreasing threshold values in the basic dither matrix within a range that does not reverse magnitude relationships among the values. In other words, the threshold values $DT_S$ ($DT_M$, $DT_L$) included in the plurality of threshold value sets in the modified dither matrix have magnitude relationships same as magnitude relationships of the plurality of threshold values included in the basic dither matrix. The control unit 11 adjusts each of the three threshold values $DT_S$, $DT_M$, and $DT_L$ using a common (the same) basic dither matrix. However, it is preferable to use a different basic dither matrix for each of the CMYK colors to reduce the likelihood of overlap among dots in the CMYK colors. For example, different basic dither matrices may be configured by using entirely different cell allocations (arrangements of threshold values unrelated to each other), as well as by modifying the screen angle, rotating the matrix, or offsetting the position of the matrix. Since the halftone process is performed on an input image rendered in 1,024 levels (values between 0 and 1,023), as described above, the threshold values in the basic dither matrices (0-255) are adjusted to values between 1 and 1,023.

FIG. 4A is a graph showing the relationship between a threshold value dithM (the threshold value before the adjustment process) of the basic dither matrix and the adjusted threshold values $DT_S$, $DT_M$, and $DT_L$. FIG. 4B is part of a table showing this relationship. The threshold value $DT_S$ is adjusted within the range $0$-$T_M$ (the significance of values $T_S$, $T_M$, and $T_L$ will be described later) to satisfy a linear relationship with the threshold value dithM of the basic dither matrix defined by Equation (1) below. The threshold value $DT_S$ is adjusted within the range of values exceeding $T_M$ so as to increase linearly toward the relative density value $V_L$ (1,023 in the preferred embodiment) corresponding to the formation of a large dot.

$$DT_S = \text{dith}M*(V_S-T_S-1)/\text{dithMax}+T_S+1 \quad \text{Equation (1)}$$

The threshold value $DT_M$ is adjusted within the range $0$-$T_L$ to satisfy a linear relationship with the threshold value dithM of the basic dither matrix defined by Equation (2) below, and is adjusted within the range exceeding $T_L$ so as to advance linearly toward the relative density value $V_L$ corresponding to the formation of a large dot.

$$DT_M = \text{dith}M*(V_M-T_M)/\text{dithMax}+T_M \quad \text{Equation (2)}$$

The threshold value $DT_L$ is adjusted to satisfy a linear relationship with the threshold value dithM of the basic dither matrix defined by Equation (3) below.

$$DT_L = \text{dith}M*(V_L-T_L)/\text{dithMax}+T_L \quad \text{Equation (31)}$$

$T_S$, $T_M$, and $T_L$ mentioned above are set as threshold values for dither adjustments based on properties of output images in the error diffusion method. That is, the threshold values $T_S$, $T_M$, and $T_L$ and the relative density values $V_S$, $V_M$, and $V_L$ are preset parameters for dither adjustments in the first embodiment, as shown in FIG. 2B. The relative density values $V_S$, $V_M$, and $V_L$ for dither adjustments are set to the same values as the relative density values used in the error diffusion method. However, the threshold values for dither adjustments are set with consideration for the usage rate of each dot size in the error diffusion method. More specifically, for solid images of each of the 0-1,023 input density values (reference images configured of a plurality of pixels having uniform input density values), the smallest input density value for which at least one small dot is formed is set to $T_S+1$, the smallest input density value for which at least one medium dot is formed is set to $T_M$, and the smallest input density value for which at least one large dot is formed is set to $T_L$ based on the output images produced in a halftone process according to the error diffusion method. In the first embodiment, $T_S$ is set to "0", $T_M$ to "134", and $T_L$ to "284".

In other words, the smallest threshold value $DT_S$ (the lowest input density value that produces a small dot) is adjusted to $T_S+1$ (1 in the first embodiment), as it is clear from Equation (1) that $DT_S = T_S+1$ when threshold value dithM=0. Similarly, the smallest threshold value $DT_M$ (the lowest input density value that produces a medium dot) is adjusted to $T_M$ (134 in the first embodiment) according to Equation (2) described above, and the smallest threshold value $DT_L$ (the lowest input density value that produces a large dot) is adjusted to $T_L$ (284 in the first embodiment) according to Equation (3) described above. Hence, the three threshold values $DT_S$, $DT_M$, and $DT_L$ are adjusted based on the usage rates of small, medium, and large dots, respectively, when performing an error diffusion halftone process on a solid image at each input density value. The "usage rate" is a ratio equivalent to the number of dots formed to the total number of pixels. For example, a 100% usage rate for large dots signifies that large dots are formed for all pixels.

According to Equation (1), the rate of increase in the threshold value $DT_S$ up to the largest value $T_M$ of the threshold value $DT_M$ (until a medium dot is generated) is adjusted so that small dots increase at a constant rate as the input density value increases. This rate of increase is adjusted so that the largest threshold value $DT_S$ equals the relative density value $V_S$ corresponding to the formation of a small dot used in the error diffusion method, assuming that the rate of increase in the threshold value $DT_S$ is constant over the entire range (up to the largest threshold value $DT_S$), since it is clear that $DT_S = V_S$ when dithM=dithMax. In other words, the rate of increase (slope) in the threshold value $DT_S$ accompanying an increase in input density values is set so that small dots will be formed for all pixels when the input density value reaches the relative density value $V_S$.

Similarly, according to Equation (2), the rate of increase in the threshold value $DT_M$ up to the largest value $T_L$ of the threshold value $DT_L$ (until a large dot is generated) is adjusted so that medium dots increase at a constant rate as the input density value increases. This rate of increase is adjusted so that the largest threshold value $DT_M$ equals the relative density value $V_M$ corresponding to the formation of a medium dot used in the error diffusion method, assuming that the rate of increase in the threshold value $DT_M$ is constant over the entire range (up to the largest threshold value $DT_M$), since it is clear that $DT_M = V_M$ when dithM=dithMax. In other words, the rate of increase (slope) in the threshold value $DT_M$ accompanying an increase in input density values is set so that medium dots will be formed for all pixels when the input density value reaches the relative density value $V_M$.

Similarly, according to Equation (3), the rate of increase in the threshold value $DT_L$ is adjusted so that large dots increase at a constant rate as the input density value increases. This rate of increase is adjusted so that the largest threshold value $DT_L$ equals the relative density value $V_L$ corresponding to the formation of a large dot used in the error diffusion method, since it is clear that $DT_L = V_L$ when dithM=dithMax. In other words, the rate of increase (slope) in the threshold value $DT_L$ accompanying an increase in input density values is set so that large dots will be formed for all pixels when the input density value reaches the relative density value $V_L$.

As described above, the threshold value $DT_S$ is adjusted based on the relative density value $V_S$ corresponding to the formation of a small dot used in the error diffusion method; the threshold value $DT_M$ is adjusted based on the relative density value $V_M$ corresponding to the formation of a medium dot; and the threshold value $DT_L$ is adjusted based on the relative density value $V_L$ corresponding to the formation of a large dot. In other words, the PC 1 modifies the basic dither matrix by adjusting at least one of three threshold values $DT_S$, $DT_M$, $DT_L$ such that the image processing device can produce a first output image by using the modified dither matrix according to the dither method, the first output image being more similar to an output image produced based on the input image according to the error diffusion method than an output image to be produced by using the basic dither matrix according to the dither method.

1-4. Halftone Process According to the Dither Method

Next, a halftone process according to the dither method executed by the control unit 11 of the PC 1 will be described with reference to the flowchart in FIG. 5. Of the steps shown in FIG. 5, the process in S103-S114 is executed for the input density value of each CMYK color for each pixel constituting the input image.

Figure 5:
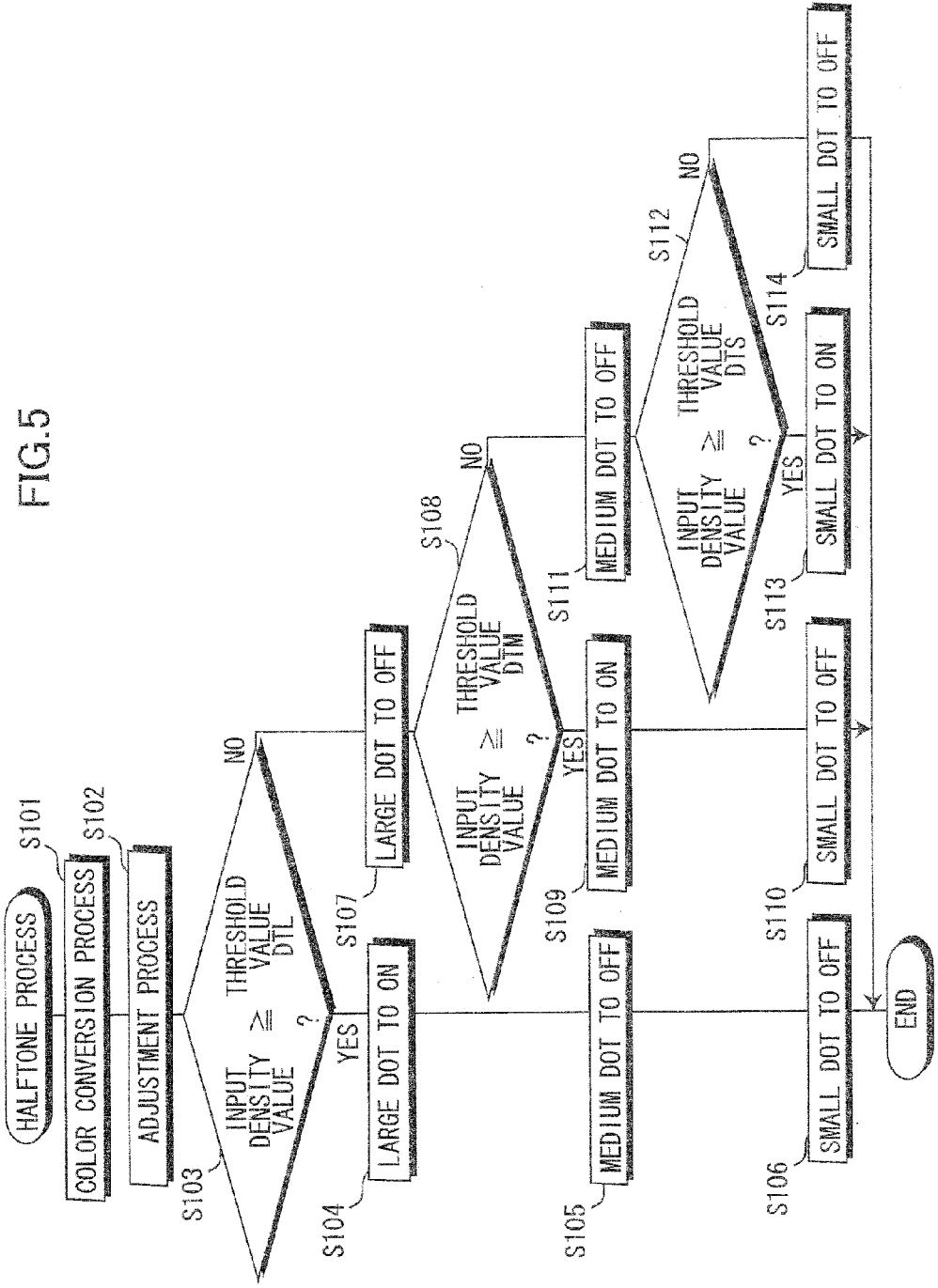
FIG. 5 is a flowchart illustrating steps in a halftone process executed by the data processing device.

In S101 of FIG. 5, the control unit 11 performs a color conversion process to convert image data expressed in 256-level RGB values representing the image to be printed into input image data expressed in 1,024-level CMYK values.

In S102 the control unit 11 performs the adjustment process described above to adjust the three threshold values $DT_S$, $DT_M$, and $DT_L$ of the dither matrix. In other words, the control unit 11 modifies the basic dither matrix to provide a modified dither matrix by adjusting the threshold values $DT_S$, $DT_M$, and $DT_L$ allocated in the modified dither matrix.

In S103 the control unit 11 determines whether or not the input density value is greater than or equal to the threshold value $DT_L$. If the input density value is greater than or equal to the threshold value $DT_L$ (S103: YES), in S104 the control unit 11 sets the large dot to ON, in S105 sets the medium dot to OFF, in S106 sets the small dot to OFF, and subsequently ends the process of FIG. 5. In other words, the control unit 11 converts the input density value to an output value corresponding to large dot formation.

However, if the control unit 11 determines in S103 that the input density value is less than the threshold value $DT_L$ (S103: NO), in S107 the control unit 11 sets the large dot to OFF, and in S108 determines whether the input density value is greater than or equal to the threshold value $DT_M$. If the input density value is greater than or equal to the threshold value $DT_M$ (S108: YES), in S109 the control unit 11 sets the medium dot to ON, in S110 sets the small dot to OFF, and subsequently ends the process of FIG. 5. In other words, the control unit 11 converts the input density value into an output value corresponding to medium dot formation.

However, if the control unit 11 determines in S108 that the input density value is smaller than the threshold value $DT_M$ (S108: NO), in S111 the control unit 11 sets the medium dot to OFF, and in S112 determines whether the input density value is greater than or equal to the threshold value $DT_S$. If the input density value is greater than or equal to the threshold value $DT_S$ (S112: YES), in S113 the control unit 11 sets the small dot to ON, and subsequently ends the process of FIG. 5. In other words, the control unit 11 converts the input density value into an output value corresponding to small dot formation.

However, if the control unit 11 determines in S112 that the input density value is smaller than the threshold value $DT_S$ (S112: NO), in S114 the control unit 11 sets the small dot to OFF, and subsequently ends the process of FIG. 5. In other words, the control unit 11 converts the input density value into an output value corresponding to no dot formation.

1-5. Effects of the First Embodiment

The PC 1 according to the first embodiment described above can closely match the quality of an output image (and by extension the quality of an image printed by the printer 2), whether the input image undergoes a halftone process according to the error diffusion method or the dither method. In particular, by adjusting the threshold values for the dither method based on relative density values used in the error diffusion method, it is easy to reflect properties of an output image produced through error diffusion in the dither method, and the output image produced from the dither method can be adjusted to a density corresponding to the relative density values of dots used in the error diffusion method.

Further, since the three threshold values $DT_S$, $DT_M$, and $DT_L$ are adjusted based on the usage rate for each of the small dots, medium dots, and large dots in the output image produced from the error diffusion method, the PC 1 can set the range of use (usage rate) for each dot used in the output image produced by the dither method to resemble that used in the output image produced by the error diffusion method.

Further, since a basic dither matrix used commonly for the three threshold values $DT_S$, $DT_M$, and $DT_L$ is adjusted only to an extent that does not reverse the magnitude relationships between the threshold values, the PC 1 can perform adjustments while maintaining these relationships among threshold values (allocation properties for threshold values in the dither matrix).

In the first embodiment, dots $D_1$-$D_N$ recited in claims (where N=3) correspond to the small dot, medium dot, and large dot, while threshold values $DT_1$-$DT_N$ recited in claims correspond to the three threshold values $DT_S$, $DT_M$, and $DT_L$.

2. Second Embodiment

The PC 1 according to a second embodiment has the same basic structure and performs the same basic processes as described in the first embodiment, but uses a different method for setting the threshold values $T_S$, $T_M$, and $T_L$ used in the dither adjustments. A description of points shared with the first embodiment will not be included below.

The error diffusion method used in the second embodiment is predicated on varying the threshold values $ET_S$, $ET_M$, and $ET_L$. Specifically, corrected threshold values $CT_S$, $CT_M$, and $CT_L$ are calculated by adding a variation value that varies for each target pixel to the threshold values $ET_S$, $ET_M$, and $ET_L$. Subsequently, the PC 1 converts the corrected density value into an output value corresponding to large dot formation when the corrected density value is greater than or equal to the corrected threshold value $CT_L$, converts the corrected density value into an output value corresponding to medium dot formation when the corrected density value is less than the corrected threshold value $CT_L$ but greater than or equal to the corrected threshold value $CT_M$, converts the corrected density value into an output value corresponding to small dot formation when the corrected density value is less than the corrected threshold value $CT_M$ but greater than or equal to the corrected threshold value $CT_S$, and converts the corrected density value into an output value corresponding to no dot formation when the corrected density value is less than the corrected threshold value $CT_S$. The variation values used here are random numbers having a range based on "0" (values whose integrated value converges to zero).

In the second embodiment, the control unit 11 then adjusts the threshold values $T_S$, $T_M$, and $T_L$ for dither adjustments to values obtained by multiplying the threshold values $ET_S$, $ET_M$, and $ET_L$ by a volatility $T_V$ of the variation value (a value found by dividing the maximum fluctuation in the threshold values by the maximum relative density value (1023); 0.5625 in the second embodiment). The threshold values $T_S$, $T_M$, and $T_L$ for dither adjustments are calculated according to the following Equations (4)-(6).

$$T_S = ET_S * T_V \quad \text{Equation (4)}$$

$$T_M = ET_M * T_V \quad \text{Equation (5)}$$

$$T_L = ET_L * T_V \quad \text{Equation (6)}$$

From Equations (4)-(6), the threshold values for dither adjustments are set as shown in FIG. 2C: $T_S$=0, $T_M$=133, and $T_L$=284.

The second embodiment described above obtains the same effects as those described in the first embodiment. Further, the second embodiment simplifies the calculation of the threshold values $T_S$, $T_M$, and $T_L$ for dither adjustments (smallest values of the threshold values $DT_S$, $DT_M$, and $DT_L$ for the dither matrix) based on the threshold values $ET_S$, $ET_M$, and $ET_L$ used in the error diffusion method and the volatility $T_V$ of the variation values.

3. Third Embodiment

The PC 1 according to the third embodiment has the same basic structure as that described in the first embodiment, but differs in the type of error diffusion method employed. The following description omits points shared with the first embodiment.

Figure 6A:
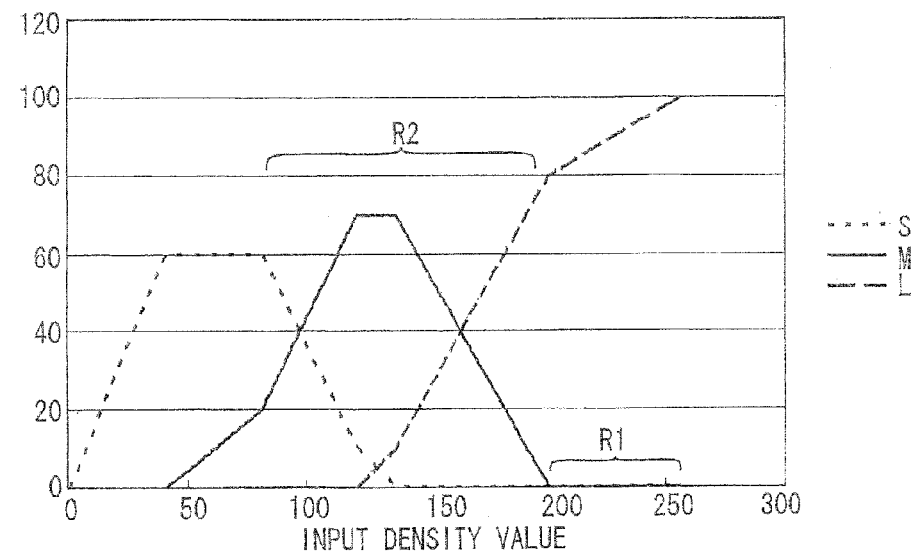
FIG. 6A is a graph showing relationships between input density values and usage rates of dots according to a third embodiment.

The error diffusion method used in the third embodiment is implemented according to predetermined relationships between each input density value and the usage rate for each of the small, medium, and large dots, as shown in the example of FIG. 6A. Although this error diffusion method is known in the art, a brief example will be given here. First, the PC 1 resolves the input density value of the target pixel to a resolved density value corresponding to each dot size based on the relationships shown in FIG. 6A (a table storing these relationships). For example, the resolved density values may be found by multiplying the relative density values for the small dot, medium dot, and large dot by the respective usage rates. Next, the PC 1 calculates a corrected resolution value by adding an error value managed for each dot size to the resolved density value of the target pixel for each dot size, and sets the output value of the target pixel based on a comparison of the corrected resolution value and the threshold value. Next, an error value is calculated for each dot size by subtracting the relative density value corresponding to the output value from the corrected resolution value. Hence, the PC 1 performs an error diffusion process (thresholding process) for setting the resolved density value of each dot size to the input density value, and manages the error value for each dot size.

Next, the control unit 11 adjusts the three threshold values $DT_S$, $DT_M$, and $DT_L$ in order that the relationships between each input density value and each usage rate of the small, medium, and large dots resembles relationships set in the error diffusion method (see FIG. 6A, for example, based on an output image produced in a halftone process according to the dither method that was performed on solid images at each of the 0-1,023 input density values (reference images configured of a plurality of pixels having uniform input density values). More specifically, the PC 1 calculates the threshold value $DT_L$ based on the large dot usage rate, calculates the threshold value $DT_M$ based on the sum of usage rates for large and medium dots, and calculates the threshold value $DT_S$ based on the sum of usage rates for large, medium, and small dots.

Figure 6B:
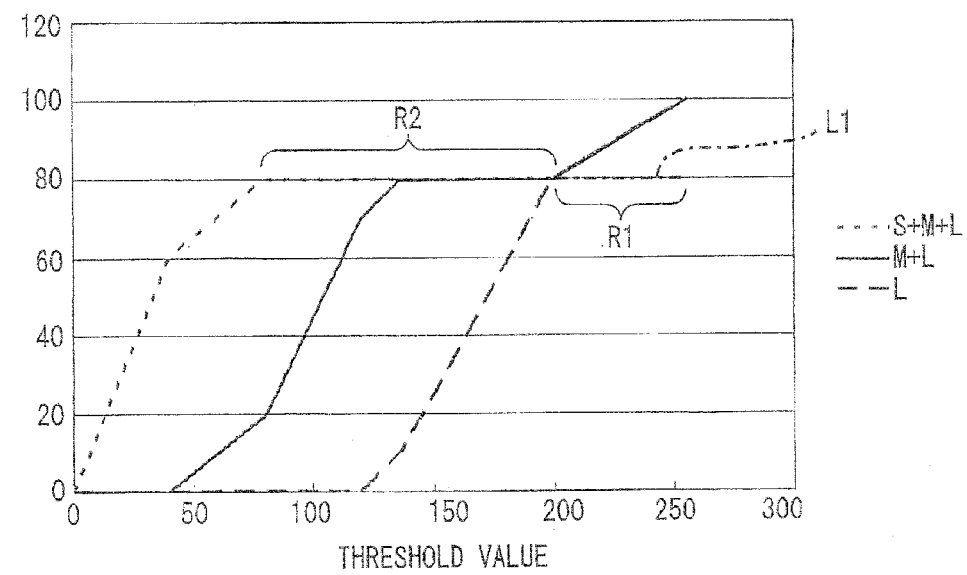
FIG. 6B is a graph showing relationships between threshold values and cumulative component ratios determined based on the graph of FIG. 6A.

FIG. 6B is a graph showing the cumulative component ratio of the three threshold values $DT_S$, $DT_M$, and $DT_L$ for the dither matrix calculated based on usage ratios of the dot sizes shown in FIG. 6A. A short dotted line S+M+L shown in FIG. 6B indicates the cumulative ratio of small, medium, and large dots, in other words, the sum of usage rates of the sum of small dot, medium dot, and large dot. A solid line M+L shown in FIG. 6B indicates the cumulative ratio of medium and large dots, in other words, the sum of usage rates of the sum of medium dot and large dot. A long dotted line L shown in FIG. 6B indicates the cumulative ratio of large dot, the cumulative ratio of large dot being an usage rate of the large dot. In order to contrast the graph with that in FIG. 6A, the horizontal axis (threshold value) is given on a scale of 0-255. In the example of FIGS. 6A and 6B, the usage rate of small and medium dots is "0" in the range R1. Within the range R1, dots of these dot sizes are prevented from being formed by setting their threshold values (the threshold values $DT_S$ and $DT_M$ in this example) to a value greater than or equal to the next largest threshold value (the threshold values $DT_M$ and $DT_L$, respectively in this example). For example, the threshold values $DT_S$ and $DT_M$ may be set to a value equal to the threshold value $DT_L$ within the range R1.

Alternatively, these dot sizes may be configured to not have threshold values within the range R1. In other words, only the threshold value $DT_L$ may be set as a single set of threshold values corresponding to cumulative component ratios 80-100% within the range R1. In this case, the cumulative component ratio of small and medium dots remains in the state indicated by the dotted line L1 (never reaching 100%). Note that the range in which the cumulative component ratio is constant (not increasing) in FIG. 6B is the range in which a threshold value does not exist. For example, a threshold value for small dots does not exist in the range R2.

Figure 7A:
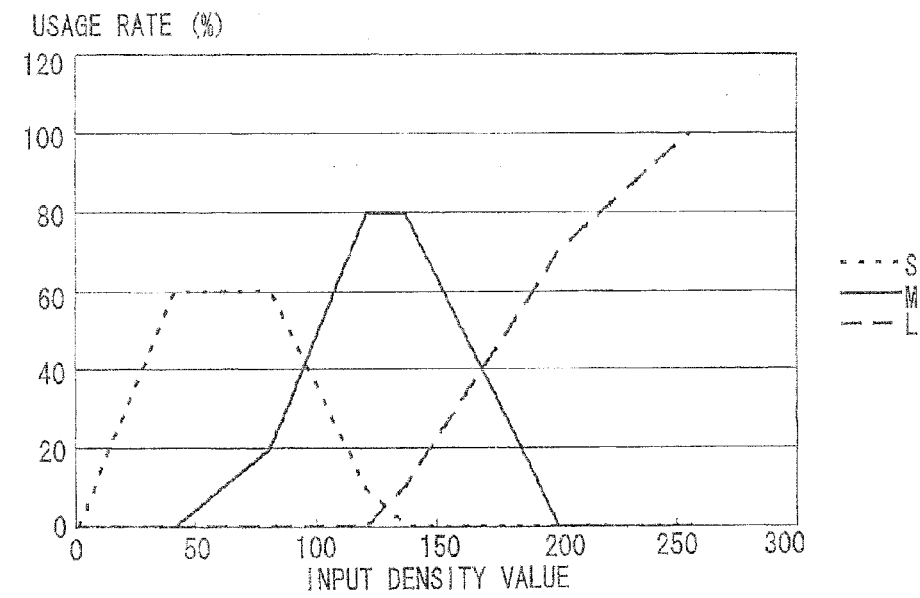
FIG. 7A is a graph showing relationships between input density values and usage rates of dots according to a modification of the third embodiment.
Figure 7B:
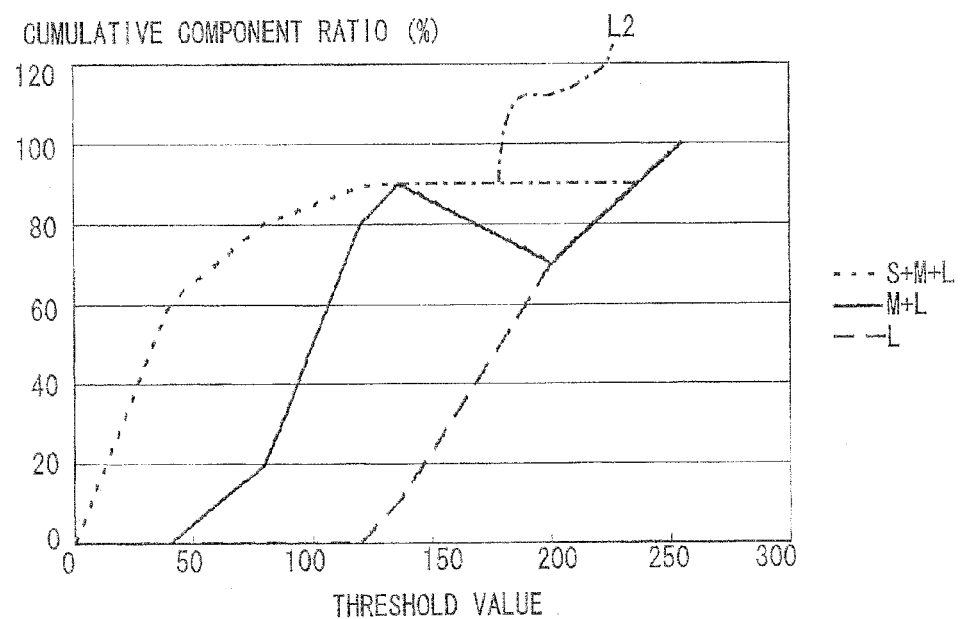
FIG. 7B is a graph showing relationships between threshold values and cumulative component ratios determined based on the graph of FIG. 7A.

FIGS. 7A and 7B are different examples corresponding to those in FIGS. 6A and 6B. As shown in FIG. 7B, this example includes a range in which the sum of usage rates for the dot sizes decreases as the input density value increases. This is possible because the sum total of dots can decrease in the error diffusion method as the input density value increases. In contrast, the total number of dots cannot decrease as the input density value increases in a dither method (i.e., the cumulative component ratio cannot decrease). Therefore, when the sum of usage rates decreases, the threshold value does not exist within this range until the cumulative component ratio increases (indicated by the dotted line L2). In other words, if the relationships set in the error diffusion method include a portion in which the total usage rate of small, medium, and large dots decreases as the input density value increases, the three threshold values $DT_S$, $DT_M$, and $DT_L$ are adjusted to approximate relationships corrected so that there exists no region in which the total usage rate decreases.

In the third embodiment described above, the PC 1 can set the usage rate of dots used in the output image of a dither method to resemble that in the output image of an error diffusion method. Accordingly, the PC 1 according to the third embodiment can closely match the quality of an output image (and by extension the quality of an image printed by the printer 2), whether the input image undergoes a halftone process according to the error diffusion method or the dither method.

While the invention has been described in detail with reference to the first through third embodiments thereof, it would be apparent to those skilled in the art that various changes and modifications may be made therein without departing from the spirit of the invention.

(1) One error diffusion method known in the art uses a predetermined threshold value matrix. As with a dither matrix, values are allocated in the threshold value matrix at positions corresponding to unit pixels of an input image, the average of the values being zero. Threshold values used in the error diffusion method can be modified by adding the value in the threshold value matrix corresponding to a target pixel. This method has the same effects as the method of adding random numbers to the threshold values and can reduce graininess in the output image.

When performing a halftone process based on this type of error diffusion method, first the PC may perform an adjustment process on threshold values in a dither matrix using the dither method based on the rate of occurrence of dots or the like in an error diffusion method not incorporating the threshold value matrix, and can subsequently add threshold values from the threshold value matrix used in the error diffusion method to the three threshold values $DT_S$, $DT_M$, and $DT_L$ produced from the adjustment process. Through this method, properties of an output image produced using the threshold value matrix in the error diffusion method can be obtained in the output image of the dither method.

(2) The first through third embodiments provide sample configurations for rendering different densities by dot size, but different densities may instead be rendered using a plurality of types of ink of different densities.

(3) In the first through third embodiments described above, the printer 2 supports four levels of density in dot formation. However, the present invention may also be applied to a printer capable of rendering three levels or five or more levels of density. In such cases, in the halftone process the PC generates image data (print data) in the number of levels supported by the printer.

(4) In the first through third embodiments described above, the adjustment process and halftone process are executed on the PC 1. However, these processes may be executed on the printer 2, for example. Alternatively, the PC 1 may be configured to execute the adjustment process while the printer 2 executes the halftone process. The embodiments described above also presume that the adjustment process is executed as part of the process performed by the printer driver 123, but the adjustment process may be executed earlier in the design stage, with the threshold values produced from the adjustment process being used by the printer driver 123 or printer 2. However, the ability to execute the adjustment process on the user's device, as described in the embodiments, rather than during the design stage, has the advantage of being able to support cases in which parameters in the error diffusion method are modified.

(5) The first through third embodiments described above are merely examples to which the present invention may be applied. However, the present invention may be implemented in various formats, including as a dither matrix creation device, a dither matrix creation method, a dither matrix creation program for controlling a computer to function as the dither matrix creation device, and a storage medium for storing such a dither matrix creation program (e.g., a CD-ROM, DVD, or other optical disc; a magnetic disc; and semiconductor memory).

What is claimed is:

1. A dither matrix creating device comprising:
a processor configured to function as:
an acquiring unit configured to acquire a basic dither matrix including a plurality of threshold values corresponding to a plurality of input values that can be inputted, respectively, the basic dither matrix being divided into a plurality of cells to which the plurality of threshold values are allocated, respectively, a threshold value that is allocated in each of the plurality of cells in the basic dither matrix being predetermined;
a modifying unit configured to modify the basic dither matrix to provide a modified dither matrix, the modified dither matrix including a plurality of sets of threshold value, each threshold value set including N number of threshold values, N being an integer greater than 1, the modified dither matrix being used by an image processing device for converting an input image into an output image according to a dither method, the image processing device being capable of converting an input image into an output image according to an error diffusion method, the input image including a plurality of input pixels each having a multi-level input density value, the output image including a plurality of output pixels each corresponding to respective one of the plurality of input pixels, each output pixel having an (N+1)-level output value, each output value indicating one of (a) that no dot is formed and (b) that one of N types of dots is formed, a dot $D_J$ indicating J-th dot of the N types of dots, a density represented by a dot $D_J$ being greater as J gets greater, J being an integer greater than or equal to 1 and smaller than or equal to N, the N threshold values including threshold values $DT_J$ indicating J-th threshold value;
wherein when the image processing device converts an input image into an output image according to the dither method, the image processing device converts each input density value into an output value in such a manner that:
the image processing device converts an input density value of an input pixel into an output value indicating that the dot $D_N$ is formed if the input density value is greater than or equal to the threshold value $DT_N$;
the image processing device converts an input value into an output value indicating that a dot $D_{J-1}$ is formed if the input density value is smaller than the threshold value $DT_J$ and greater than or equal to the threshold value $DT_{J-1}$ where J is greater than 1 and smaller than or equal to N; and
the image processing device converts an input value into an output value indicating that no dot is formed if the input density value is smaller than the threshold value $DT_J$;
wherein the modifying unit modifies the basic dither matrix by adjusting at least one of N number of threshold values such that the image processing device can produce a first output image by using the modified dither matrix according to the dither method, the first output image being more similar to an output image produced based on the input image according to the error diffusion method than an output image to be produced by using the basic dither matrix according to the dither method,
wherein when the image processing device converts an input image into an output image according to the error diffusion method, the image processing device converts an input density value of a pixel included in the input image into an output value by using a single set of N number of threshold values $ET_1$ through $ET_N$, a threshold value $ET_J$ indicating J-th threshold value of the N number of threshold values $ET_1$ through $ET_N$;
wherein when the image processing device converts an input image into an output image according to the error diffusion method, the image processing device converts each input density value into an output value in such a manner that:
the image processing device corrects, for each of input pixels included in the input image, the threshold values $ET_1$ through $ET_N$ to provide a corrected threshold values $CT_1$ through $CT_N$ by adding a variation value respective threshold values $ET_1$ through $ET_N$;
the image processing device converts an input density value of an input pixel into an output value indicating that the dot $D_N$ is formed if the input density value is greater than or equal to the corrected threshold value $CT_N$;
the image processing device converts an input value into an output value indicating that the dot $D_{J-1}$ is formed if the input density value is smaller than the corrected threshold value $CT_J$ and greater than or equal to the corrected threshold value $CT_{J-1}$ where J is greater than 1 and smaller than or equal to N; and
the image processing device converts an input value into an output value indicating that no dot is formed if the input density value is smaller than the corrected threshold value $CT_1$;
wherein each of the plurality of threshold value sets included in the modified dither matrix corresponds to respective one of the plurality of threshold values included in the basic matrix, a threshold value set included in the modified dither matrix that corresponds to a minimum threshold value smallest among the plurality of threshold values included in the basic dither matrix including N number of minimum threshold values $MDT_1$ through $MDT_N$, a minimum threshold value $MDT_J$ indicating a minimum threshold value among the threshold values $DT_J$ included in the plurality of threshold value sets;
wherein the modifying unit calculates the minimum threshold value $MDT_1$ through $MDT_N$ by multiplying the threshold values $ET_1$ through $ET_N$ by a volatility of variation values.

2. The dither matrix creating device according to claim 1, wherein when the image processing device converts an input image into an output image according to the error diffusion method, the image processing device converts an input density value of an input pixel included in the input image into an output value, acquires an error value by subtracting a relative density value corresponding to the output value from the input density value of the pixel, and reflects the error value in unprocessed pixels, the relative density value being predetermined for each of N type of dots.

3. The dither matrix creating device according to claim 2, wherein the modifying unit modifies the basic dither matrix to the modified dither matrix by adjusting a threshold value $DT_K$ of N threshold values based on a relative density value corresponding to an output value indicating that a dot $D_K$ of N number of dots is formed, K being an integer greater than or equal to 1 and smaller than or equal to N,
wherein when the image processing device converts an input image including a plurality of input pixels each having the relative density value corresponding to the dot $D_K$ into an output image according to the error diffusion method, the output image includes at least one pixel having an output value indicating that the dot $D_K$ is formed.

4. The dither matrix creating device according to claim 1, wherein each of the plurality of threshold value sets included in the modified dither matrix corresponds to respective one of the plurality of threshold values included in the basic matrix, a threshold value set included in the modified dither matrix that corresponds to a minimum threshold value smallest among the plurality of threshold values included in the basic dither matrix including N number of minimum threshold values $MDT_1$ through $MDT_N$, a minimum threshold value $MDT_J$ indicating a minimum threshold value among the threshold values $DT_J$ included in the plurality of threshold value sets, the threshold values $DT_J$ increasing linearly from the minimum threshold value $MDT_{J-1}$ toward to the minimum threshold value $MDT_J$ as a threshold value included in the basic dither matrix and corresponding to the threshold value $DT_J$ gets greater wherein J is greater than 1.

5. The dither matrix creating device according to claim 1, wherein the modifying unit modifies the basic dither matrix to provide the modified dither matrix by modifying a threshold value $DT_K$ of N number of threshold values based on an usage rate of dot $D_K$, the usage rate of dot $D_K$ indicating a ratio of a pixel number of reference output pixels having an output value that the dot $D_K$ is formed to a total number of the reference output pixels when the image processing device converts a reference input image into a reference output image including the reference output values according to the error diffusion method, the reference input image including a plurality of reference input values having a single input density value, the reference output image including the reference output pixels, K being an integer greater than or equal to 1 and smaller than or equal to N.

6. The dither matrix creating device according to claim 5, wherein each of the plurality of threshold value sets included in the modified dither matrix corresponds to respective one of the plurality of threshold values included in the basic matrix, a threshold value set included in the modified dither matrix that corresponds to a minimum threshold value smallest among the plurality of threshold values included in the basic dither matrix including N number of minimum threshold values $MDT_1$ through $MDT_N$, a minimum threshold value $MDT_J$ indicating a minimum threshold value among the threshold values $DT_J$ included in the plurality of threshold value sets, the threshold values $DT_J$ increasing linearly from the minimum threshold value $MDT_{J-1}$ toward to the minimum threshold value $MDT_J$ as a threshold value included in the basic dither matrix and corresponding to the threshold value $DT_J$ gets greater wherein J is greater than 1;
wherein the modifying unit modifies the basic dither matrix to provide the modified dither matrix by adjusting the minimum threshold value MDTK based on a minimum input density value, the image processing device converting the reference input image having the minimum input density value into the reference output image including at least one pixel indicating that the dot $D_K$ is formed according to the error diffusion method, the image processing device converting the reference input image having a single input density value smaller than the minimum input density value into the reference output image excluding a pixel indicating that the dot $D_K$ is formed according to the error diffusion method.

7. A dither matrix creating device comprising:
a processor configured to function as:
an acquiring unit configured to acquire a basic dither matrix including a plurality of threshold values corresponding to a plurality of input values that can be inputted, respectively, the basic dither matrix being divided into a plurality of cells to which the plurality of threshold values are allocated, respectively, a threshold value that is allocated in each of the plurality of cells in the basic dither matrix being predetermined;
a modifying unit configured to modify the basic dither matrix to provide a modified dither matrix, the modified dither matrix including a plurality of sets of threshold value, each threshold value set including N number of threshold values, N being an integer greater than 1, the modified dither matrix being used by an image processing device for converting an input image into an output image according to a dither method, the image processing device being capable of converting an input image into an output image according to an error diffusion method, the input image including a plurality of input pixels each having a multi-level input density value, the output image including a plurality of output pixels each corresponding to respective one of the plurality of input pixels, each output pixel having an (N+1)-level output value, each output value indicating one of (a) that no dot is formed and (b) that one of N types of dots is formed, a dot $D_J$ indicating J-th dot of the N types of dots, a density represented by a dot $D_J$ being greater as J gets greater, J being an integer greater than or equal to 1 and smaller than or equal to N, the N threshold values including threshold values $DT_J$ indicating J-th threshold value;
wherein when the image processing device converts an input image into an output image according to the dither method, the image processing device converts each input density value into an output value in such a manner that:
the image processing device converts an input density value of an input pixel into an output value indicating that the dot $D_N$ is formed if the input density value is greater than or equal to the threshold value $DT_N$;
the image processing device converts an input value into an output value indicating that a dot $D_{J-1}$ is formed if the input density value is smaller than the threshold value $DT_J$ and greater than or equal to the threshold value $DT_{J-1}$ where J is greater than 1 and smaller than or equal to N; and
the image processing device converts an input value into an output value indicating that no dot is formed if the input density value is smaller than the threshold value $DT_1$;
wherein the modifying unit modifies the basic dither matrix by adjusting at least one of N number of threshold values such that the image processing device can produce a first output image by using the modified dither matrix according to the dither method, the first output image being more similar to an output image produced based on the input image according to the error diffusion method than an output image to be produced by using the basic dither matrix according to the dither method,
wherein when the image processing device converts an input image into an output image according to the error diffusion method, the image processing device converts an input density value of a pixel included in the input image into an output value according to a predetermined relationship between the input density value and an usage rate of dot $D_K$, the usage rate of dot $D_K$ indicating a ratio of a pixel number of reference output pixels having an output value that the dot $D_K$ is formed to a total number of the reference output pixels when the image processing device converts a reference input image into a reference output image including the reference output values according to the error diffusion method, the reference input image including a plurality of reference input values having a single input density value, the reference output image including the reference output pixels, K being an integer greater than or equal to 1 and smaller than or equal to N;

wherein the processor is further configured to function as a correcting unit configured to correct, if the predetermined relationship includes a range of input density value in which a sum of usage rates for all dots $D_1$ through $D_N$ decreases as the input density value increases, the predetermined relationship to a corrected relationship such that the sum of usage rates fails to decrease in the range of input density value as the input density value increases;

wherein the modifying unit modifies the basic dither matrix to the modified dither matrix by adjusting a threshold value $DT_K$ of N number of threshold values based on the corrected relationship.

8. The dither matrix according to claim 1, wherein the image processing device converts the input image into the output image by using a predetermined threshold value matrix in the error diffusion method, the predetermined threshold value matrix including a plurality of additional values;

wherein the modifying unit includes:

an adjusting unit configured to adjust, for at least one set of threshold values included in the modified dither matrix, a threshold value $DT_K$ of N threshold values based on a relative density value corresponding to a dot $D_K$ of N dots, the relative density value being predetermined for each of N type of dots, K being an integer greater than or equal to 1 and smaller than or equal to N; and an adding unit configured to add the additional value corresponding to the at least one set of threshold values to the threshold value $DT_K$ adjusted by adjusting unit to update the threshold value $DT_K$.

9. The dither matrix creating device according to claim 1, wherein the threshold values $DT_K$ included in the plurality of threshold value sets have magnitude relationships same as magnitude relationships of the plurality of threshold values included in the basic dither matrix, K being an integer greater than or equal to 1 and smaller than or equal to N.

10. A non-transitory computer readable storage medium storing a set of program instructions installed on and executed by a computer, the program instructions comprising:

acquiring a basic dither matrix including a plurality of threshold values corresponding to a plurality of input values that can be inputted, respectively, the basic dither matrix being divided into a plurality of cells to which the plurality of threshold values are allocated, respectively, a threshold value that is allocated in each of the plurality of cells in the basic dither matrix being predetermined; and modifying the basic dither matrix to provide a modified dither matrix, the modified dither matrix including a plurality of sets of threshold value, each threshold value set including N number of threshold values, N being an integer greater than 1, the modified dither matrix being used by an image processing device for converting an input image into an output image according to a dither method, the image processing device being capable of converting an input image into an output image according to an error diffusion method, the input image including a plurality of input pixels each having a multi-level input density value, the output image including a plurality of output pixels each corresponding to respective one of the plurality of input pixels, each output pixel having an (N+1)-level output value, each output value indicating one of (a) that no dot is formed and (b) that one of N types of dots is formed, a dot $D_J$ indicating J-th dot of the N types of dots, a density represented by a dot $D_J$ being greater as J gets greater, J being an integer greater than or equal to 1 and smaller than or equal to N, the N threshold values including threshold values $DT_J$ indicating J-th threshold value;

wherein when the image processing device converts an input image into an output image according to the dither method, the image processing device converts each input density value into an output value in such a manner that:

the image processing device converts an input density value of an input pixel into an output value indicating that the dot $D_N$ is formed if the input density value is greater than or equal to the threshold value $DT_N$;

the image processing device converts an input value into an output value indicating that a dot $D_{J-1}$ is formed if the input density value is smaller than the threshold value $DT_J$ and greater than or equal to the threshold value $DT_{J-1}$ where J is greater than 1 and smaller than or equal to N; and the image processing device converts an input value into an output value indicating that no dot is formed if the input density value is smaller than the threshold value $DT_1$;

wherein the basic dither matrix is modified to the modified dither matrix by adjusting at least one of N number of threshold values such that the image processing device can produce a first output image by using the modified dither matrix according to the dither method, the first output image being more similar to an output image produced based on the input image according to the error diffusion method than an output image to be produced by using the basic dither matrix according to the dither method, wherein when the image processing device converts an input image into an output image according to the error diffusion method, the image processing device converts an input density value of a pixel included in the input image into an output value by using a single set of N number of threshold values $ET_1$ through $ET_N$, a threshold value $ET_1$ indicating J-th threshold value of the N number of threshold values $ET_1$ through $ET_N$;

wherein when the image processing device converts an input image into an output image according to the error diffusion method, the image processing device converts each input density value into an output value in such a manner that:

the image processing device corrects, for each of input pixels included in the input image, the threshold values $ET_1$ through $ET_N$ to provide a corrected threshold values $CT_1$ through $CT_N$ by adding a variation value respective threshold values $ET_1$ through $ET_N$;

the image processing device converts an input density value of an input pixel into an output value indicating that the dot $D_N$ is formed if the input density value is greater than or equal to the corrected threshold value $CT_N$;

the image processing device converts an input value into an output value indicating that the dot $D_{J-1}$ is formed if the input density value is smaller than the corrected threshold value $CT_J$ and greater than or equal to the corrected threshold value $CT_{J-1}$ where J is greater than 1 and smaller than or equal to N; and the image processing device converts an input value into an output value indicating that no dot is formed if the input density value is smaller than the corrected threshold value $CT_1$;

wherein each of the plurality of threshold value sets included in the modified dither matrix corresponds to respective one of the plurality of threshold values included in the basic matrix, a threshold value set included in the modified dither matrix that corresponds to a minimum threshold value smallest among the plurality of threshold values included in the basic dither matrix including N number of minimum threshold values $MDT_1$ through $MDT_N$, a minimum threshold value $MDT_J$ indicating a minimum threshold value among the threshold values $DT_J$ included in the plurality of threshold value sets, the minimum threshold value $MDT_1$ through $MDT_N$ calculated by multiplying the threshold values $ET_1$ through $ET_N$ by a volatility of variation values.

11. A dither matrix creating method comprising:

acquiring a basic dither matrix including a plurality of threshold values corresponding to a plurality of input values that can be inputted, respectively, the basic dither matrix being divided into a plurality of cells to which the plurality of threshold values are allocated, respectively, a threshold value that is allocated in each of the plurality of cells in the basic dither matrix being predetermined; and modifying the basic dither matrix to provide a modified dither matrix, the modified dither matrix including a plurality of sets of threshold value, each threshold value set including N number of threshold values, N being an integer greater than 1, the modified dither matrix being used by an image processing device for converting an input image into an output image according to a dither method, the image processing device being capable of converting an input image into an output image according to an error diffusion method, the input image including a plurality of input pixels each having a multi-level input density value, the output image including a plurality of output pixels each corresponding to respective one of the plurality of input pixels, each output pixel having an (N+1)-level output value, each output value indicating one of (a) that no dot is formed and (b) that one of N types of dots is formed, a dot $D_J$ indicating J-th dot of the N types of dots, a density represented by a dot $D_J$ being greater as J gets greater, J being an integer greater than or equal to 1 and smaller than or equal to N, the N threshold values including threshold values $DT_J$ indicating J-th threshold value;

wherein when the image processing device converts an input image into an output image according to the dither method, the image processing device converts each input density value into an output value in such a manner that:

the image processing device converts an input density value of an input pixel into an output value indicating that the dot $D_N$ is formed if the input density value is greater than or equal to the threshold value $DT_N$;

the image processing device converts an input value into an output value indicating that a dot $D_{J-1}$ is formed if the input density value is smaller than the threshold value $DT_J$ and greater than or equal to the threshold value $DT_{J-1}$ where J is greater than 1 and smaller than or equal to N; and the image processing device converts an input value into an output value indicating that no dot is formed if the input density value is smaller than the threshold value $DT_1$;

wherein the basic dither matrix is modified to the modified dither matrix by adjusting at least one of N number of threshold values such that the image processing device can produce a first output image by using the modified dither matrix according to the dither method, the first output image being more similar to an output image produced based on the input image according to the error diffusion method than an output image to be produced by using the basic dither matrix according to the dither method, wherein when the image processing device converts an input image into an output image according to the error diffusion method, the image processing device converts an input density value of a pixel included in the input image into an output value by using a single set of N number of threshold values $ET_1$ through $ET_N$, a threshold value $ET_J$ indicating J-th threshold value of the N number of threshold values $ET_1$ through $ET_N$;

wherein when the image processing device converts an input image into an output image according to the error diffusion method, the image processing device converts each input density value into an output value in such a manner that:

the image processing device corrects, for each of input pixels included in the input image, the threshold values $ET_1$ through $ET_N$ to provide a corrected threshold values $CT_1$ through $CT_N$ by adding a variation value respective threshold values $ET_1$ through $ET_N$;

the image processing device converts an input density value of an input pixel into an output value indicating that the dot $D_N$ is formed if the input density value is greater than or equal to the corrected threshold value $CT_N$;

the image processing device converts an input value into an output value indicating that the dot $D_{J-1}$ is formed if the input density value is smaller than the corrected threshold value $CT_J$ and greater than or equal to the corrected threshold value $CT_{J-1}$ where J is greater than 1 and smaller than or equal to N; and the image processing device converts an input value into an output value indicating that no dot is formed if the input density value is smaller than the corrected threshold value $CT_1$;

wherein each of the plurality of threshold value sets included in the modified dither matrix corresponds to respective one of the plurality of threshold values included in the basic matrix, a threshold value set included in the modified dither matrix that corresponds to a minimum threshold value smallest among the plurality of threshold values included in the basic dither matrix including N number of minimum threshold values $MDT_1$ through $MDT_N$, a minimum threshold value $MDT_J$ indicating a minimum threshold value among the threshold values $DT_J$ included in the plurality of threshold value sets, the minimum threshold value $MDT_1$ through $MDT_N$ calculated by multiplying the threshold values $ET_1$ through $ET_N$ by a volatility of variation values.

* * * * *